US011704032B2

(12) United States Patent
Gyllenskog

(10) Patent No.: US 11,704,032 B2
(45) Date of Patent: Jul. 18, 2023

(54) SWITCHABLE LANE DIRECTIONS BETWEEN A HOST SYSTEM AND A MEMORY SYSTEM

(71) Applicant: Micron Technology, Inc., Boise, ID (US)

(72) Inventor: Christian M. Gyllenskog, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/240,927

(22) Filed: Apr. 26, 2021

(65) Prior Publication Data
US 2022/0342572 A1 Oct. 27, 2022

(51) Int. Cl.
*G06F 3/06* (2006.01)

(52) U.S. Cl.
CPC .......... *G06F 3/0635* (2013.01); *G06F 3/0613* (2013.01); *G06F 3/0659* (2013.01); *G06F 3/0679* (2013.01)

(58) Field of Classification Search
CPC .... G06F 3/0635; G06F 3/0659; G06F 3/0679; G06F 3/061–0613; G06F 13/1678; G06F 13/4022; G06F 13/42; G06F 13/4265; G06F 13/4269; G06F 13/4282; G06F 13/4286

USPC .......... 710/38, 316, 317, 9, 12, 29
See application file for complete search history.

(56) References Cited

U.S. PATENT DOCUMENTS

| | | | |
|---|---|---|---|
| 2012/0324146 A1* | 12/2012 | Marks | G06F 3/0613 711/E12.001 |
| 2018/0113828 A1* | 4/2018 | Ellis | G06F 5/065 |
| 2019/0089624 A1* | 3/2019 | Berchanskiy | H04L 45/66 |
| 2021/0294375 A1* | 9/2021 | Brett | G06F 9/4411 |
| 2022/0147254 A1* | 5/2022 | Kang | G06F 3/0613 |

* cited by examiner

*Primary Examiner* — Ilwoo Park
(74) *Attorney, Agent, or Firm* — Holland & Hart LLP

(57) ABSTRACT

Methods, systems, and devices supporting switchable lane directions between a host system and a memory system are described. A host system may communicate with a memory system using a set of lanes, where each lane may send information (e.g., commands, operations, data) in a specific direction. In some cases, the host system and memory system may support one or more switchable lanes, where both systems include transmit and receive modules for the lane. According to a bandwidth condition associated with a specific direction satisfying a threshold for reconfiguring a lane, the host system and the memory system may switch a direction configured for a lane. Switching the lane direction may increase the supported bandwidth in a specific direction, for example, from the host system to the memory system (e.g., in a "write optimized" configuration) or from the memory system to the host system (e.g., in a "read optimized" configuration).

16 Claims, 8 Drawing Sheets

SWITCHABLE LANE DIRECTIONS BETWEEN A HOST SYSTEM AND A MEMORY SYSTEM

FIELD OF TECHNOLOGY

The following relates generally to one or more systems for memory and more specifically to switchable lane directions between a host system and a memory system.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
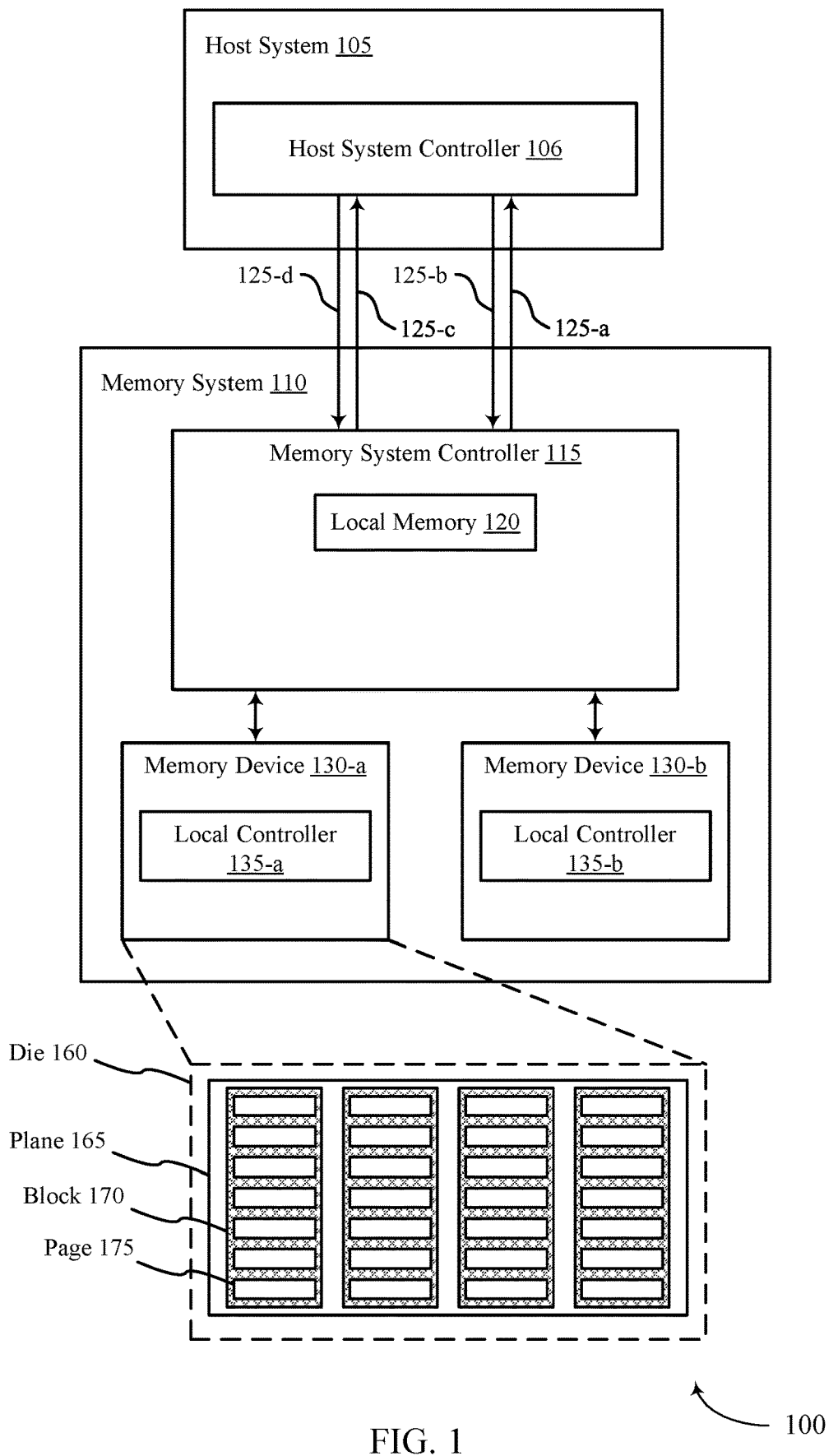
FIGS. 1 and 2 illustrate examples of systems that support switchable lane directions between a host system and a memory system in accordance with examples as disclosed herein.

A host system may communicate information with a memory system using a set of lanes. Each lane may be configured to send information in a specific direction. For example, a lane may be configured as a transmit (Tx)-to-receive (Rx) lane from a first system to a second system, such as the host system to the memory system or a Tx-to-Rx lane from a first system to a second system, such as the memory system to the host system. In some cases, the host system and the memory system may be configured with a symmetrical configuration of lanes (e.g., a same quantity of Tx-to-Rx lanes from the host system as Tx-to-Rx lanes from the memory system). However, communication traffic between two systems, such as a host system and a memory system, may not be symmetrical between the host system and the memory system. For example, due to a quantity of commands, such as read commands or write commands, issued by the host system, the bandwidth based on the commands in a first direction (e.g., from the host system or from the memory system) may exceed a capacity of the lanes and may be relatively high, while the bandwidth in a second direction based on the commands may not exceed a capacity of the lanes and may be relatively low (e.g., below a bandwidth threshold). Such a configuration may inefficiently utilize the capacity supported by the lanes and may introduce latency in the first direction. For example, the capacity of the lanes in the first direction may be saturated, such that information may be backlogged for sending in the first direction, while information sent in the second direction may be below the capacity of the lanes, such that one or more lanes configured in the second direction may be idle or underutilized.

To support improved efficiency of lane usage between a host system and a memory system, the host system and the memory system may use one or more switchable lanes. A switchable lane may be capable of being switched for the direction of signaling carried by the lane, such that the lane may operate as a Tx-to-Rx lane from the host system or as a Tx-to-Rx lane from the memory system. The host system and the memory system may each include a transmit module and a receive module for the lane to support the switching capability. The host system, the memory system, or both may determine whether to dynamically switch the direction of a switchable lane in response to specific bandwidth conditions. For example, if a bandwidth condition associated with a first direction (e.g., from the memory system to the host system) satisfies a threshold (e.g., exceeds a bandwidth threshold), one or more of the systems may reconfigure a switchable lane to operate as a Tx-to-Rx lane (e.g., from the memory system). Due to the switching, the set of lanes may support additional capacity from the memory system to the host system in this example—improving throughput and mitigating a backlog of information in the first direction. Such a configuration may in some examples be referred to as a "read optimized" configuration (e.g., referring to the increased bandwidth available to read data from the memory system). Alternatively, if a bandwidth condition associated with a second direction (e.g., from the host system to the memory system) satisfies a threshold, the systems may reconfigure a switchable lane to operate as a Tx-to-Rx lane (e.g., from the host system), supporting additional throughput and mitigating a backlog of information in the second direction. Such a configuration may in some examples be referred to as a "write optimized" configuration (e.g., referring to the increased bandwidth available to write data to the memory system).

Figure 2:
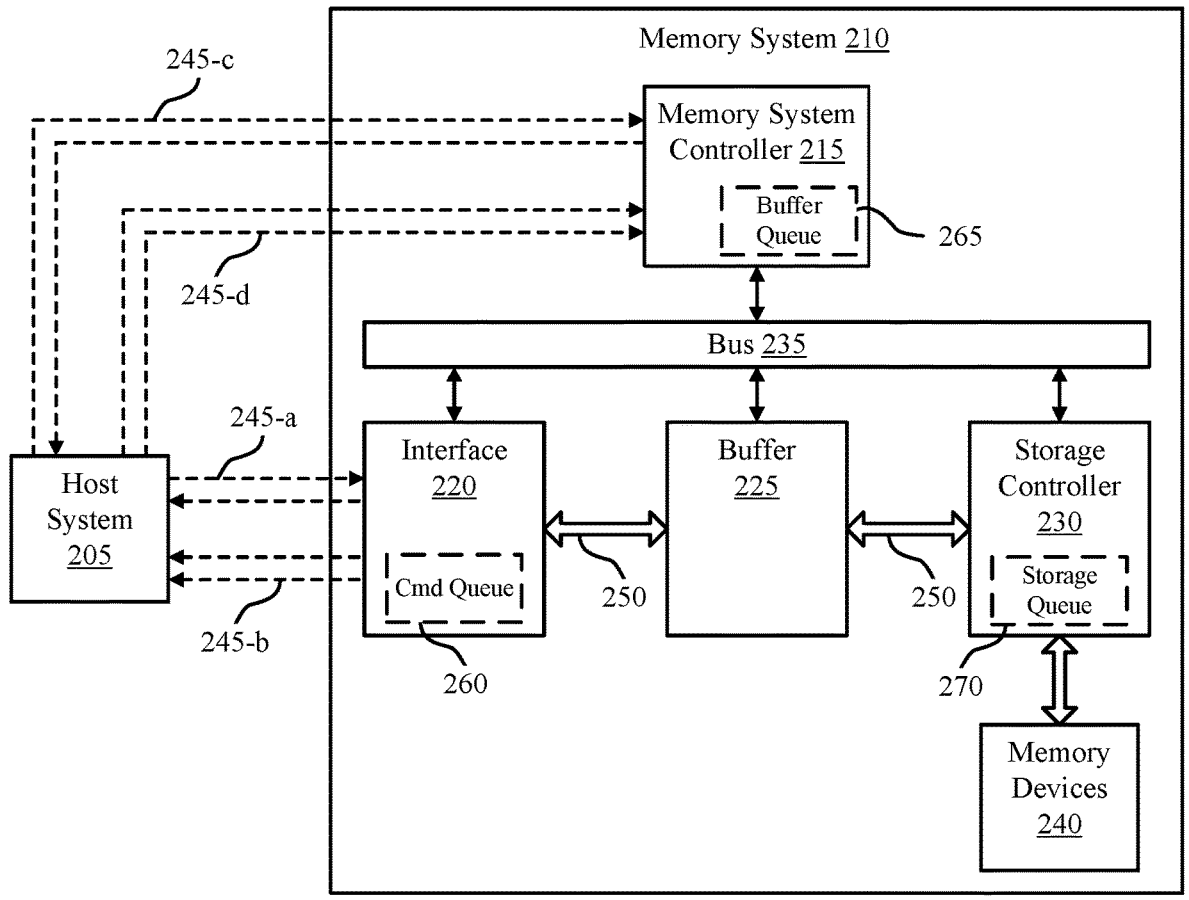

Features of the disclosure are initially described in the context of systems and devices with reference to FIGS. 1 and 2. Features of the disclosure are additionally described in the context of lane configurations and a process flow for dynamically switching lane configurations with reference to FIGS. 3A, 3B, 3C, and 4. These and other features of the disclosure are further illustrated by and described in the context of apparatus diagrams and flowcharts that relate to switchable lane directions between a host system and a memory system with reference to FIGS. 5 through 8.

FIG. 1 illustrates an example of a system 100 that supports switchable lane directions between a host system and a memory system in accordance with examples as disclosed herein. The system 100 includes a host system 105 coupled with a memory system 110. The host system 105 and the memory system 110 may be coupled using a set of lanes 125.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

In some examples, the physical host interface may include one or more links, lanes 125, or some combination thereof. A link may support bidirectional communication between the host system 105 and the memory system 110. Each link may be an interconnection of lanes 125 (e.g., a pair of lanes 125), and each lane 125 may support unidirectional communication either from the host system 105 to the memory system 110 or from the memory system 110 to the host system 105. For example, a lane 125 may include a transmit module, a receive module, and a line, which is a point-to-point interconnect between the transmit module and the receive module and is capable of transporting information (e.g., as a signal). As illustrated, the host system 105 and the memory system 110 may be coupled using a first link including a lane 125-*a* and a lane 125-*b* and a second link including a lane 125-*c* and a lane 125-*d*. In some cases, a lane 125 may be an example of an M-PHY lane (e.g., supporting a data communications physical layer protocol for mobile, multimedia devices). Each lane 125 may support a bandwidth capacity in a specific direction. As an example, a lane 125 may support 20 gigabits per second, which may correspond to supporting 2 gigabytes per second (GB/s) of usable information (e.g., data) after decoding. Accordingly, a host system 105 and a memory system 110 configured with two links—each including a pair of unidirectional lane 125 in opposite directions—may support approximately 4 GB/s of data communications in each direction, concurrently.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support switchable lane directions between a host system 105 and a memory system 110. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The host system 105 may communicate commands, operations, data, or other messaging with the memory system using one or more of the lanes 125. However, in some cases, the host system 105 and memory system 110 may inefficiently utilize the bandwidth supported by the lanes 125. For example, one or more lanes 125 may have a capacity for data transmission that is unused (e.g., sits idle) for a portion of time (e.g., if the bandwidth is not currently in use). Additionally or alternatively, information may be backlogged (e.g., at the host system 105 or the memory system 110) if the full capacity of the lanes 125 in a specific direction is utilized. For example, the lane 125 utilization may be inefficient if the host system 105 performs significantly more write operations than read operations or significantly more read operations than write operations (e.g., greater than a threshold proportion).

To efficiently utilize the bandwidth supported by the lanes 125, the system 100 may use one or more switchable lanes 125. A switchable lane 125 may be configured to switch directionality. In some cases, switching the direction of a lane 125 may switch a link from supporting bidirectional transmission to supporting unidirectional transmissions. Switching the direction of a lane 125 (e.g., from a first direction to a second direction) may increase bandwidth in the second direction. The host system 105, memory system 110, or both may dynamically trigger a direction switch for a lane 125 in response to one or more factors, such as a bandwidth condition. For example, if the bandwidth from the host system 105 to the memory system 110 satisfies a threshold condition (e.g., exceeds a threshold value), the host system 105 and memory system 110 may switch a lane 125 to support Tx-to-Rx from the host system 105. For example, using a lane configuration as illustrated in FIG. 1, the set of lanes 125 between the host system 105 and the memory system 110 may support communication of 4 GB/s of data in each direction. To support additional bandwidth from the host system 105 to the memory system 110, the system 100 may switch the direction of the lane 125-c, such that three lanes 125 are from the host system 105 to the memory system 110 and one lane 125 is from the memory system 110 to the host system 105. Accordingly, the set of lanes 125 may support communication of 6 GB/s of data from the host system 105 to the memory system 110. Alternatively, if the bandwidth from the memory system 110 to the host system 105 satisfies a threshold condition (e.g., exceeds a threshold value), the host system 105 and memory system 110 may switch a lane 125 (e.g., the lane 125-d) to support Tx-to-Rx from the memory system 110. By dynamically switching lane directions in response to bandwidth conditions, the host system 105 and memory system 110 may efficiently use the total bandwidth supported by the lanes 125, improve the throughput in specific directions in response to specific bandwidth conditions, and reduce backlogs and corresponding latencies of information between the host system 105 and the memory system 110.

FIG. 2 illustrates an example of a system 200 that supports switchable lane directions between a host system and a memory system in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

The system 200 may support switchable lanes between the host system 205 and the memory system 210. For example, a lane may be an example of a wire or trace between one or more pins of a host system controller and one or more pins of the memory system controller 215 (or the interface 220). The lane may connect to a module (e.g., at two signaling pins) at the host system controller and a module (e.g., at two signaling pins) at the memory system controller 215. For a non-switchable lane, such modules may be static; for example, a lane between a transmit module at the host system controller and a receive module at the memory system controller 215 supports Tx-to-Rx from the host system 205, while a lane between a receive module at the host system controller and a transmit module at the memory system controller 215 supports Tx-to-Rx from the memory system 210. In contrast, the host system controller and the memory system controller 215 may each include both a transmit module and a receive module for a switchable lane. The host system controller and the memory system controller 215 may activate one module and deactivate the other to send information over the lane in a specific direction. For example, the host system controller, the memory system controller 215, or both may include logic or switches to switch between activating (e.g., powering or otherwise energizing) a transmit module at the controller (e.g., with the receive module deactivated at the controller) and activating a receive module at the controller (e.g., with the transmit module deactivated at the controller). The transmit modules and receive modules, as described herein, may be examples of hardware components (e.g., M-PHY transmission hardware and M-PHY receiving hardware), software components, firmware components, logic, or any combination thereof.

In some examples, the lanes may be grouped into pairs, referred to as links 245. The links 245 may be between a host system controller and an interface 220 (e.g., link 245-a and link 245-b), between a host system controller and a memory system controller 215 (e.g., link 245-c and link 245-d), or some combination thereof. For non-switchable lanes, a link 245 may include a pair of unidirectional lanes in opposite directions, such that the link 245 supports bidirectional communications between the host system 205 and the memory system 210. However, for switchable lanes, a link 245 may include a pair of unidirectional lanes that may switch directions (e.g., controlled by commands, operations, or logic at the host system 205, the memory system 210, or both). Accordingly, a link 245 with switchable lanes may support bidirectional communications between the host system 205 and the memory system 210 (e.g., link 245-c), unidirectional communications from the host system 205 to the memory system 210 (e.g., link 245-d), and unidirectional communications from the memory system 210 to the host system 205 (e.g., link 245-b) according to the current directions of the lanes within the link 245. In some examples, the system 200 may support one link 245 with non-switchable lanes (e.g., link 245-a) and one or more links 245 with switchable lanes, such that the system 200 maintains at least one lane in each direction.

Figure 3A:
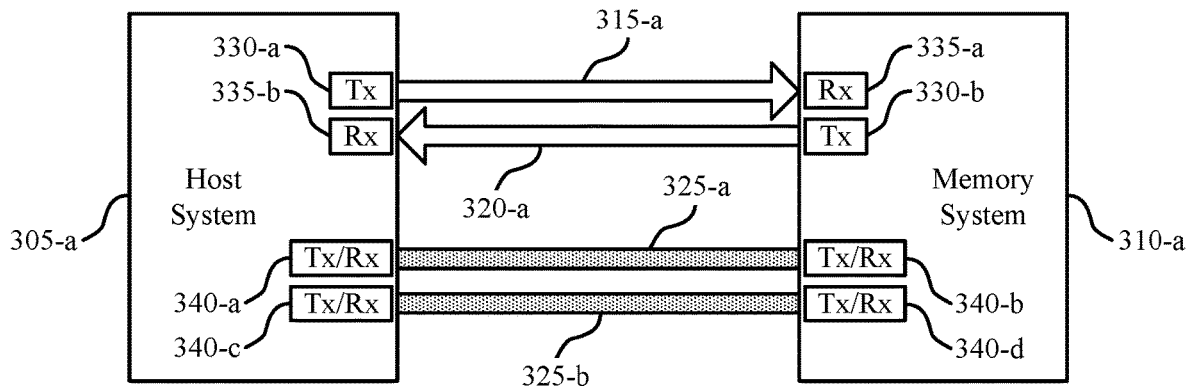
FIGS. 3A, 3B, and 3C illustrate examples of lane configurations that support switchable lane directions between a host system and a memory system in accordance with examples as disclosed herein.

FIG. 3A illustrates an example of a lane configuration 300-a that supports switchable lane directions between a host system and a memory system in accordance with examples as disclosed herein. The lane configuration 300-a may couple a host system 305-a to a memory system 310-a, where the host system 305-a, memory system 310-a, or both may be examples of the corresponding systems described with reference to FIGS. 1 and 2. The lane configuration 300-a may include two links, each with two lanes. However, in some examples, the lane configuration 300-a may support any quantity of links, lanes, or both between the host system 305-a and the memory system 310-a.

The lane configuration 300-a may support a link with non-switchable lanes. For example, the lane configuration 300-a may maintain a Tx-to-Rx lane 315-a from the host system 305-a and a Tx-to-Rx lane 320-a from the memory system 310-a. In some examples, such lanes may be non-switchable due to a hardware configuration. For example, the Tx-to-Rx lane 315-a from the host system 305-a may connect to a transmit module 330-a at the host system controller and a receive module 335-a at the memory system controller. Similarly, the Tx-to-Rx lane 320-a from the memory system 310-a may connect to a transmit module 330-b at the memory system controller and a receive module 335-b at the host system controller. Accordingly, the transmit modules 330 and the receive modules 335 may define the directions of the non-switchable lanes. Alternatively, in some other examples, such lanes may be non-switchable according to logic or policies at the host system 305-a, the memory system 310-a, or both. For example, the host system 305-a, the memory system 310-a, or both may operate such that at least one link is maintained with non-switchable lanes, such that the host system 305-a and the memory system 310-a maintain a non-zero bandwidth capacity in each direction. In some cases, the host system 305-a, the memory system 310-a, or both may use the non-switchable lanes to communicate operations, commands, or other information related to configuring switchable lanes 325.

The lane configuration 300-a may additionally support a link with switchable lanes 325. For example, the lane configuration 300-a may include a switchable lane 325-a and a switchable lane 325-b. The host system controller and memory system controller may include transmit and receive modules 340 at each end of a switchable lane 325. For example, the switchable lane 325-a may connect to transmit and receive modules 340-a at the host system controller and transmit and receive modules 340-b at the memory system controller. Similarly, the switchable lane 325-b may connect to transmit and receive modules 340-c at the host system controller and transmit and receive modules 340-d at the memory system controller.

To configure the switchable lane 325-a as a Tx-to-Rx lane 315 from the host system 305-a, the host system controller may activate the transmit module and deactivate the receive module of the transmit and receive modules 340-a, and the memory system controller may activate the receive module and deactivate the transmit module of the transmit and receive modules 340-b. Activating the transmit module at the host system controller and activating the receive module at the memory system controller may allow for a flow of electrons from the host system 305-a to the memory system 310-a, supporting signaling of information (e.g., data, commands) from the host system 305-*a* to the memory system 310-*a*. Alternatively, to configure the switchable lane 325-*a* as a Tx-to-Rx lane 320 from the memory system 310-*a*, the host system controller may deactivate the transmit module and activate the receive module of the transmit and receive modules 340-*a*, and the memory system controller may deactivate the receive module and activate the transmit module of the transmit and receive modules 340-*b*. Activating the transmit module at the memory system controller and activating the receive module at the host system controller may allow for a flow of electrons from the memory system 310-*a* to the host system 305-*a*, supporting signaling of information (e.g., data, responses) from the memory system 310-*a* to the host system 305-*a*.

Other systems may use non-switchable lanes in a symmetrical configuration, with a constant bandwidth capacity in each direction. However, bandwidth usage may not be symmetrical and may vary in time. Fluctuations in bandwidth usage may result in one or more lanes being idle for periods of time in between transmitting bursts of information (e.g., data, commands, responses, or other information). For example, to perform a set of read commands, a memory system may send data to a host system at a threshold data rate (e.g., a maximum supported data rate or other data rate) supported by the lane configuration. If the memory system is handling read commands but not write commands (or is handling write commands for relatively small amounts of data) during a time period, the lanes sending data from the memory system to the host system may be full, while one or more lanes supporting data transmission from the host system to the memory system may be idle. Similarly, if the memory system is handling write commands but not read commands (or is handling read commands for relatively small amounts of data) during a time period, the lanes sending data to the memory system from the host system may be full, while one or more lanes supporting data transmission from the memory system to the host system may be idle. Accordingly, such systems may inefficiently utilize the bandwidth capabilities of the lanes.

In contrast, the lane configuration 300-*a* may dynamically adjust the bandwidth capacity in specific directions in response to the type of work being performed by the memory system 310-*a* (e.g., reading or writing data) by switching lane directions. The switchable lane configuration may support an increase in potential channel bandwidth and, correspondingly, throughput in either direction depending on the current bandwidth conditions between the host system 305-*a* and the memory system 310-*a* (e.g., without increasing the quantity of lanes or pins between the host system 305-*a* and the memory system 310-*a*). For example, the transmission bandwidth at a threshold transfer rate—such as a maximum supported speed—may be adapted for a specific direction in response to current bandwidth conditions, for example, by more frequently utilizing the full set of lanes due to the switching.

In some examples, a unified protocol (UniPro) may operate as a management layer for the lanes (e.g., M-PHY lanes) between the host system 305-*a* and the memory system 310-*a* (e.g., including a UFS device). UniPro may configure the lanes between the host system 305-*a* and the memory system 310-*a* using capabilities of the lanes and may control data flow across the lanes. To support switchable lanes, UniPro may additionally include a lane switching control mechanism that may monitor for one or more bandwidth triggers from the memory system 310-*a* (e.g., a memory device, a memory system controller, a buffer), the host system 305-*a* (e.g., a host system controller, a buffer), or some combination thereof. If a bandwidth trigger is detected (e.g., by the memory system 310-*a*, the host system 305-*a*, or both), the memory system 310-*a*, the host system 305-*a*, or both may request for UniPro to switch a lane direction in order to increase bandwidth capacity in a specific direction. To switch a lane direction, UniPro may deactivate the switchable lane 325, switch the direction at both the host system 305-*a* and the memory system 310-*a* (e.g., by switching the active module for the transmit and receive modules 340), and reactivate the switchable lane 325. In some examples, UniPro may maintain the set of non-switchable lanes to support communications in both directions between the host system 305-*a* and the memory system 310-*a* even while deactivating and reconfiguring the switchable lanes. In some cases, the lane switch may correspond to a specific time duration, a specific set of tasks, or some combination thereof. Upon expiration of the time duration, completion of the set of tasks, or both, UniPro may switch the lane direction back to a default lane direction. In some examples, a default lane configuration may be a symmetrical configuration of lanes (e.g., where switchable lane 325-*a* and switchable lane 325-*b* communicate data in opposite directions).

UniPro or another management layer for the switchable lanes 325 may support any quantity of bandwidth triggers for triggering a direction switch for one or more lanes. In some examples, a system (e.g., the memory system 310-*a*, the host system 305-*a*, or both) may trigger a lane direction switch in response to a quantity of data ready to transfer or a quantity of data ready to receive satisfying a threshold quantity of data. Additionally or alternatively, a system may trigger a switch in response to a data rate for a direction satisfying a saturation threshold (e.g., if the lanes currently configured for sending data in the direction are full or transferring a threshold data rate). In some examples, a system may trigger a switch in response to detecting a backlog of data in a buffer, for example, as a result of retrieving data at a faster rate than the data can be sent over the set of lanes. In some cases, detecting the backlog may involve determining whether an amount of data currently in a buffer satisfies a threshold amount of data or determining whether a rate of data being added to a buffer satisfies a threshold data rate. Additionally or alternatively, a system may trigger a switch in response to detecting a capability to send or receive additional amounts of information in a specific direction. For example, if the system detects one or more idle lanes in a first direction, and the bandwidth in the second direction satisfies a bandwidth threshold, the system may trigger a lane direction switch for the one or more idle lanes.

In some examples, the host system 305-*a* or the memory system 310-*a* may control the lane switching. For example, either system may trigger a reconfiguration of a lane to switch the lane's direction. If the host system 305-*a* triggers the switch, the host system 305-*a* may transmit an indication to reconfigure the lane's direction to the memory system 310-*a*, such that the lane direction is switched on both ends of the lane. Similarly, if the memory system 310-*a* triggers the switch, the memory system 310-*a* may transmit an indication to reconfigure the lane's direction to the host system 305-*a*.

In some other examples, the host system 305-*a* may control the lane switching, while the memory system 310-*a* may request or otherwise indicate an availability to perform lane direction switching. The host system 305-*a* and the memory system 310-*a* may support messaging to indicate information relevant to switchable lane directions. For example, to perform a read operation, the host system 305-*a* may send a command UFS protocol information unit (UPIU) indicating a read operation for a set of data. The memory system 310-*a* may respond with one or more data in UPIUs, where each data in UPIU includes a portion of the set of data. In some cases, a data in UPIU may include an indicator (e.g., a field, a flag) for the memory system 310-*a* to indicate a request for a lane direction switch. For example, if the memory system 310-*a* sets the flag, the set flag may indicate that the memory system 310-*a* is requesting a "read optimized" configuration (e.g., in which at least one switchable lane 325 is switched to be a Tx-to-Rx lane 320 from the memory system 310-*a*). The memory system 310-*a* may set the flag in response to detecting a bandwidth trigger. The host system 305-*a* may receive the data in UPIU, determine whether the flag is set (e.g., whether the flag is set or is not set), and determine to perform the lane direction switch. For example, the host system 305-*a* may trigger the lane direction switch at the host system controller and may transmit, to the memory system 310-*a*, an indication to correspondingly reconfigure the lane direction at the memory system controller.

Additionally or alternatively, to perform a write operation, the host system 305-*a* may send a command UPIU indicating a write operation to the memory system 310-*a*. The memory system 310-*a* may respond with one or more ready to transfer (RTT) UPIUs, where each RTT UPIU may indicate a portion of the data for the host system 305-*a* to send (e.g., in a data out UPIU). In some cases, an RTT UPIU may include an indicator (e.g., a field, a flag) for the memory system 310-*a* to indicate a request for a lane direction switch. For example, if the memory system 310-*a* sets the flag, the set flag may indicate that the memory system 310-*a* is requesting a "write optimized" configuration (e.g., in which at least one switchable lane 325 is switched to be a Tx-to-Rx lane 315 from the host system 305-*a*). The memory system 310-*a* may set the flag in response to detecting a bandwidth trigger. The host system 305-*a* may receive the RTT UPIU, determine that the flag is set, and determine to perform the lane direction switch. For example, the host system 305-*a* may trigger the lane direction switch at the host system controller and may transmit, to the memory system 310-*a*, an indication to correspondingly reconfigure the lane direction at the memory system controller.

Figure 3B:
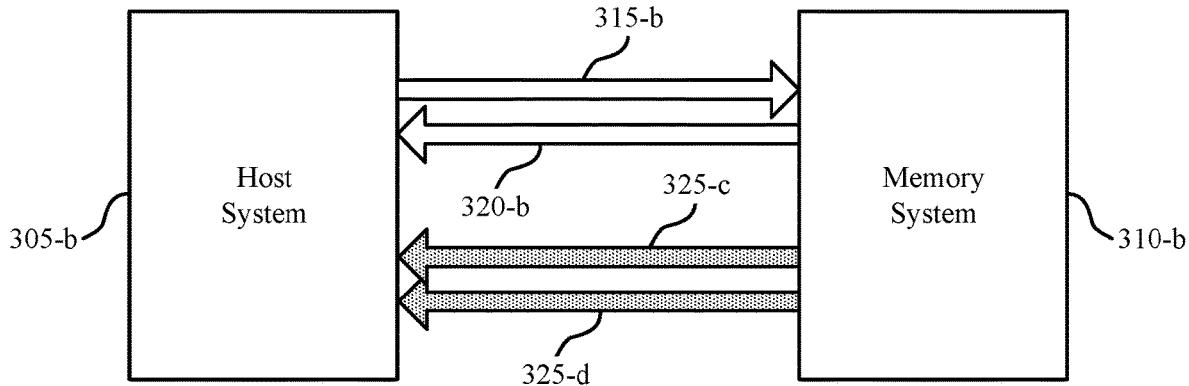

FIG. 3B illustrates an example of a lane configuration 300-*b* that supports switchable lane directions between a host system and a memory system in accordance with examples as disclosed herein. The lane configuration 300-*b* may support a "read optimized" configuration. For example, the lane configuration 300-*b* may include one or more links with non-switchable lanes and one or more links with switchable lanes 325. To support additional bandwidth capacity from the memory system 310-*b* to the host system 305-*b*, a greater proportion of switchable lanes 325 may be configured as Tx-to-Rx lanes 320 from the memory system 310-*b* (e.g., as compared to configured as Tx-to-Rx lanes 315 from the host system 305-*b*). The host system 305-*b*, memory system 310-*b*, or both may be examples of the corresponding systems described with reference to FIGS. 1, 2, and 3A.

In some examples, the memory system 310-*b* may determine whether the memory system 310-*b* is reading data from a memory die or memory device (e.g., a NAND device or other memory device) at a higher data rate than is supported by a bandwidth capability from the memory system 310-*b* to the host system 305-*b*. For example, if a symmetrical configuration of lanes (e.g., where switchable lane 325-*c* and switchable lane 325-*d* communicate data in opposite directions) supports a first data rate from the memory system 310-*b* to the host system 305-*b*, and the memory system 310-*b* reads data from one or more memory devices at a second data rate greater than the first data rate, data may build up at a buffer of the memory system 310-*b* faster than the buffer can send the data to the host system 305-*b*. In some cases, the memory system 310-*b* may send a data in UPIU to the host system 305-*b* requesting additional bandwidth for the direction from the memory system 310-*b* to the host system 305-*b*. The host system 305-*b* may receive the data in UPIU and trigger a switch of a lane direction to increase the bandwidth capacity from the memory system 310-*b* to the host system 305-*b*. For example, the host system controller may switch a direction configured for the switchable lane 325-*c*. Accordingly, the lane configuration 300-*b* may include one Tx-to-Rx lane 315-*b* from the host system 305-*b* and three Tx-to-Rx lanes 320 from the memory system 310-*b* (e.g., the Tx-to-Rx lane 320-*b* from the memory system 310-*b*, the switchable lane 325-*c*, and the switchable lane 325-*d*). Reconfiguring the lanes from the symmetrical configuration to the "read optimized" configuration may increase the bandwidth capacity from the memory system 310-*b* to the host system 305-*b* by approximately 50%, supporting additional data throughput for read operations (e.g., in a "homogenous" read scenario, in which the memory system 310-*b* handles a significant quantity of read operations and relatively few—or no—write operations for a specific time period).

Figure 3C:
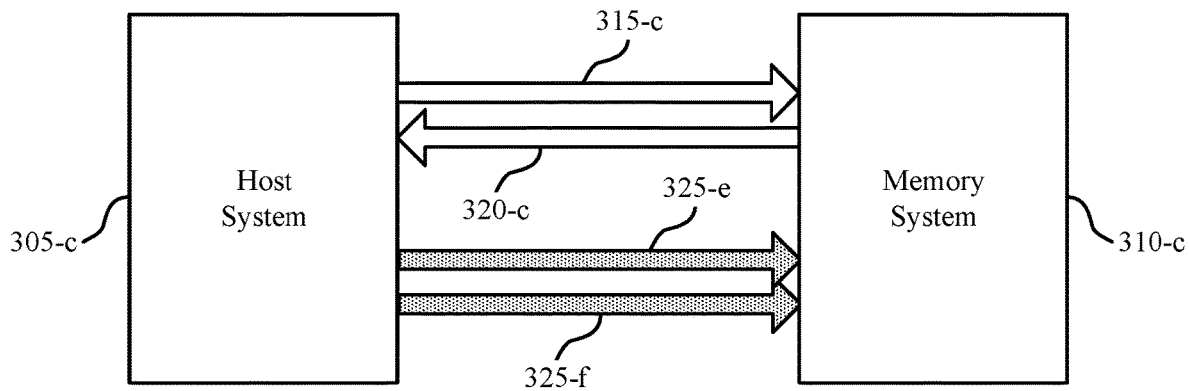

FIG. 3C illustrates an example of a lane configuration 300-*c* that supports switchable lane directions between a host system and a memory system in accordance with examples as disclosed herein. The lane configuration 300-*c* may support a "write optimized" configuration. For example, the lane configuration 300-*c* may include one or more links with non-switchable lanes and one or more links with switchable lanes 325. To support additional bandwidth capacity from the host system 305-*c* to the memory system 310-*c*, a greater proportion of switchable lanes 325 may be configured as Tx-to-Rx lanes 315 from the host system 305-*c*. The host system 305-*c*, memory system 310-*c*, or both may be examples of the corresponding systems described with reference to FIGS. 1, 2, 3A, and 3B.

In some examples, the memory system 310-*c* may determine whether the memory system 310-*c* is receiving information (e.g., commands, data) from the host system 305-*c* at a data rate satisfying a bandwidth capacity threshold. For example, the memory system 310-*c* may be receiving information from the host system 305-*c* at the data rate currently supported by the bandwidth capacity from the host system 305-*c* to the memory system 310-*c*. In some cases, the memory system 310-*c* may send an RTT UPIU to the host system 305-*c* requesting additional bandwidth for the direction from the host system 305-*c* to the memory system 310-*c*. The host system 305-*c* may receive the RTT UPIU and determine whether to trigger a switch of a lane direction to increase the bandwidth capacity from the host system 305-*c* to the memory system 310-*c*. In some cases, the host system 305-*c* may trigger the switch if the host system 305-*c* detects a backlog of information to send to the memory system 310-*c* at a buffer of the host system 305-*c*. The host system controller may switch a direction configured for the switchable lane 325-*f*. Accordingly, the lane configuration 300-*c* may include one Tx-to-Rx lane 320-*c* from the memory system 310-*c* and three Tx-to-Rx lanes 315 from the host system 305-*c* (e.g., the Tx-to-Rx lane 315-*c* from the host system 305-*c*, the switchable lane 325-*e*, and the switchable lane 325-*f*). Reconfiguring the lanes from the symmetrical configuration to the "write optimized" configuration may increase the bandwidth capacity from the host system 305-*c* to the memory system 310-*c* by approximately 50%, supporting additional data throughput for write operations (e.g., in a "homogenous" write scenario, in which the memory system 310-*c* handles a significant quantity of write operations and relatively few—or no—read operations for a specific time period).

Figure 4:
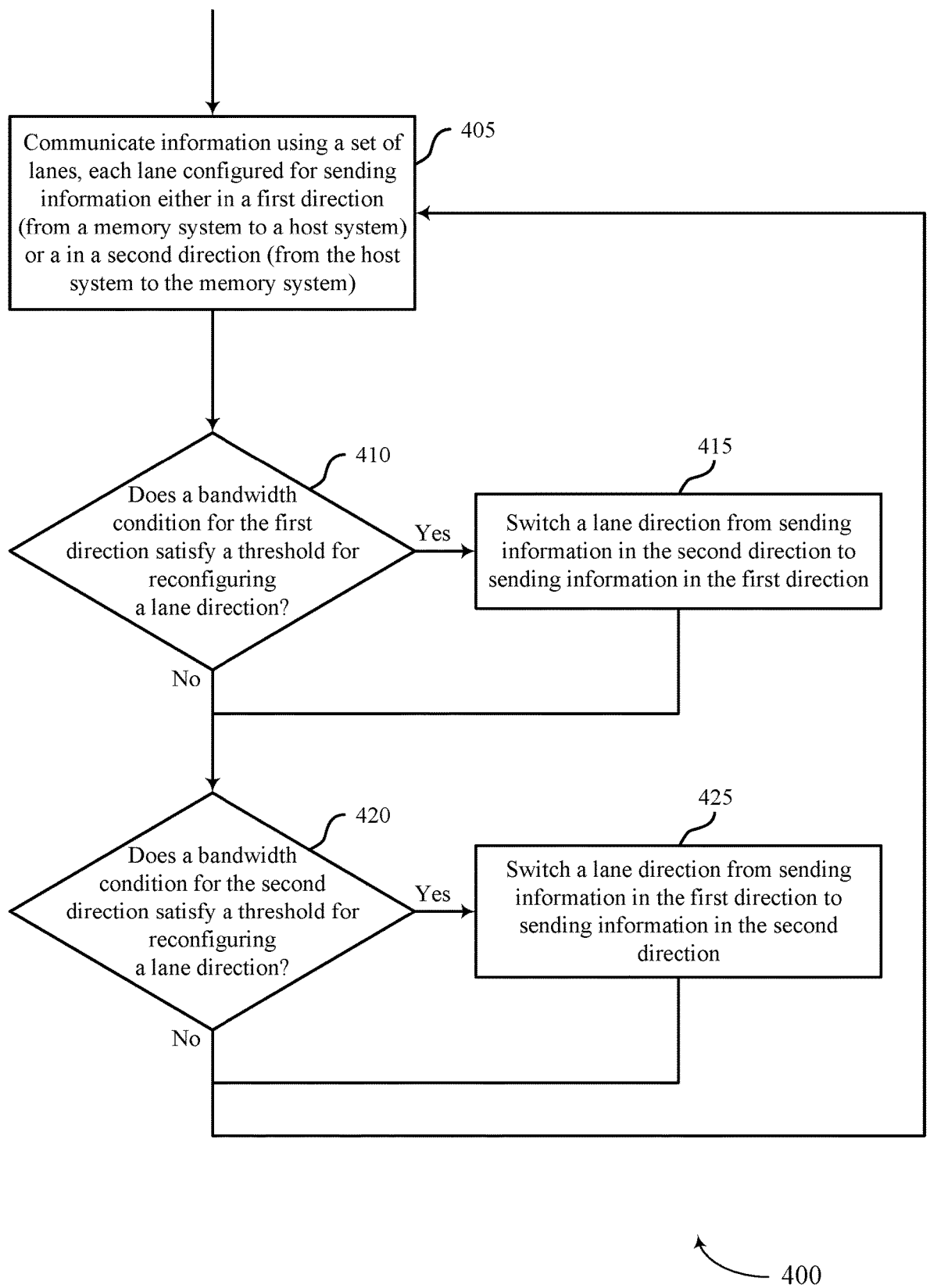
FIG. 4 illustrates an example of a process flow that supports switchable lane directions between a host system and a memory system in accordance with examples as disclosed herein.

FIG. 4 illustrates an example of a process flow 400 that supports switchable lane directions between a host system and a memory system in accordance with examples as disclosed herein. The process flow 400 may be implemented by a system 100 (or one or more components thereof) or a system 200 (or one or more components thereof) as described with reference to FIGS. 1 and 2. The process flow 400 may support dynamically switching between lane configurations, as described with reference to FIGS. 3A, 3B, and 3C. For example, the process flow 400 may be implemented by an apparatus (e.g., a host system, a memory system) or a system of apparatuses (e.g., a host system coupled to a memory system). The host system and memory system may dynamically switch lane directions to improve bandwidth utilization for a set of lanes between the host system and the memory system, improving an overall performance capability for the host system and memory system. In some cases, alternative examples of the following may be implemented, where some operations may be performed in a different order than described or are not performed. Additionally or alternatively, operations may include additional features not mentioned below, or further processes may be added.

At 405, information is communicated using a set of lanes. For example, information may be communicated between a memory system and a host system over the set of lanes. Each lane may be configured for sending information in either a first direction or a second direction. For example, the set of lanes may include a first subset of lanes configured for sending information in a first direction from the memory system to the host system and a second subset of lanes configured for sending information in a second direction from the host system to the memory system.

At 410, a system (e.g., the host system, the memory system, or both) may determine whether a bandwidth condition for the first direction satisfies a threshold for reconfiguring a lane direction. For example, the host system may send one or more read commands to the memory system, and the memory system may read, from a memory die including a memory device, data to send to the host system. If the memory system detects that a quantity of the data read from the memory die exceeds a first bandwidth supported by the set of lanes for the first direction (e.g., according to the data rates and channel bandwidth capacity), the memory system may determine to trigger a lane switch. For example, if the bandwidth condition for the first direction satisfies the threshold, at 415, a lane direction is switched. The host system and the memory system may reconfigure a direction for a lane, such that the reconfigured lane sends information in the first direction (e.g., to increase the bandwidth for sending data in response to the one or more read commands). If the bandwidth condition for the first direction fails to satisfy the threshold, the host system and the memory system may refrain from reconfiguring a lane to the first direction.

At 420, a system (e.g., the host system, the memory system, or both) may determine whether a bandwidth condition for the second direction satisfies a threshold for reconfiguring a lane direction. The bandwidth condition for the first direction and the bandwidth condition for the second direction may be the same or different bandwidth conditions. In some examples, the host system may send data to the memory system as part of a write operation. If the memory system detects that the memory system supports writing the data to a memory die at a rate exceeding a second bandwidth supported by the set of lanes for the second direction (e.g., according to the data rates and channel bandwidth capacity), the memory system may determine to trigger a lane switch. For example, if the bandwidth condition for the second direction satisfies the threshold, at 425, a lane direction is switched. The host system and the memory system may reconfigure a direction for a lane, such that the reconfigured lane sends information in the second direction (e.g., to increase the bandwidth for sending data in response to one or more write commands). If the bandwidth condition for the second direction fails to satisfy the threshold, the host system and the memory system may refrain from reconfiguring a lane to the second direction.

The host system and memory system may communicate information using the set of lanes, which in some cases may be reconfigured for different directions. The host system and memory system may continue to track bandwidth conditions and dynamically determine to update lane directions to support different bandwidth capacities in the first direction and the second direction at different periods in time.

Figure 5:
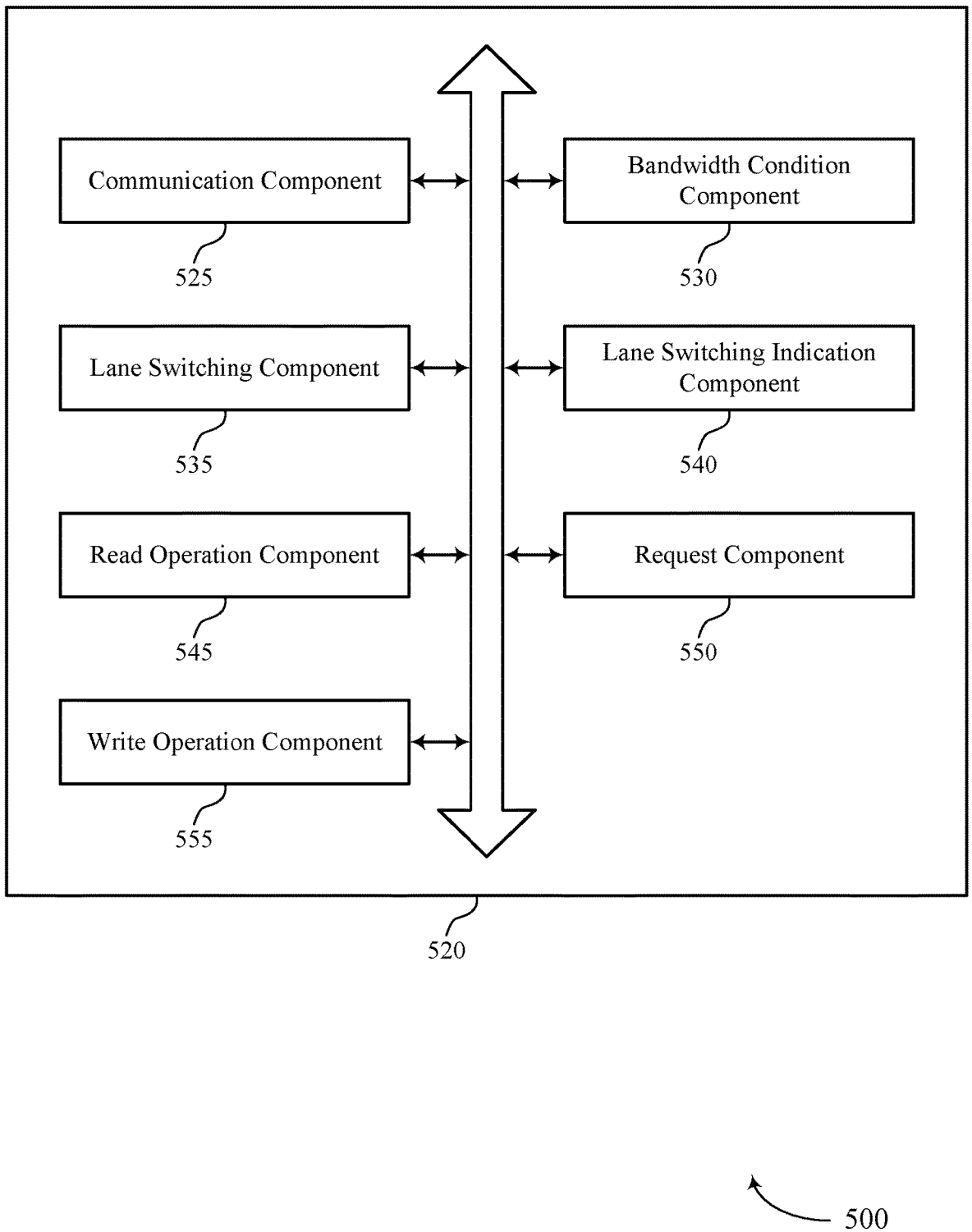
FIG. 5 shows a block diagram of a memory system that supports switchable lane directions between a host system and the memory system in accordance with examples as disclosed herein.

FIG. 5 shows a block diagram 500 of a memory system 520 that supports switchable lane directions between a host system and a memory system in accordance with examples as disclosed herein. The memory system 520 may be an example of aspects of a memory system as described with reference to FIGS. 1 through 4. The memory system 520, or various components thereof, may be an example of means for performing various aspects of switchable lane directions between a host system and a memory system as described herein. For example, the memory system 520 may include a communication component 525, a bandwidth condition component 530, a lane switching component 535, a lane switching indication component 540, a read operation component 545, a request component 550, a write operation component 555, or any combination thereof. Each of these components may communicate, directly or indirectly, with one another (e.g., via one or more buses).

The communication component 525 may be configured as or otherwise support a means for communicating information with a host system using a set of lanes, where the set of lanes includes a first subset of lanes configured for sending information in a first direction from the memory system to the host system and a second subset of lanes configured for sending information in a second direction from the host system to the memory system. The bandwidth condition component 530 may be configured as or otherwise support a means for determining whether a bandwidth condition associated with one or both of the first direction or the second direction satisfies a threshold for reconfiguring a lane of the set of lanes based at least in part on one or both of a first bandwidth supported by the set of lanes for the first direction or a second bandwidth supported by the set of lanes for the second direction. The lane switching component 535 may be configured as or otherwise support a means for switching a direction configured for the lane based at least in part on determining that the bandwidth condition associated with one or both of the first direction or the second direction satisfies the threshold.

In some examples, the lane is configured for sending information in the second direction from the host system to the memory system. In some examples, to determine whether the bandwidth condition associated with one or both of the first direction or the second direction satisfies the threshold, the bandwidth condition component 530 may be configured as or otherwise support a means for determining that a first bandwidth condition associated with the first direction from the memory system to the host system satisfies the threshold for reconfiguring the lane. In some examples, to switch the direction configured for the lane, the lane switching component 535 may be configured as or otherwise support a means for switching the lane from being configured for sending information in the second direction from the host system to the memory system to being configured for sending information in the first direction from the memory system to the host system based at least in part on determining that the first bandwidth condition associated with the first direction satisfies the threshold.

In some examples, the read operation component 545 may be configured as or otherwise support a means for reading, from a memory die including a memory device, data to send to the host system. In some examples, the bandwidth condition component 530 may be configured as or otherwise support a means for detecting that a quantity of the data read from the memory die exceeds the first bandwidth supported by the set of lanes for the first direction, where determining that the first bandwidth condition associated with the first direction satisfies the threshold is based at least in part on the detecting. In some examples, the request component 550 may be configured as or otherwise support a means for sending, to the host system, an indication of a request to reconfigure the set of lanes to support additional bandwidth in the first direction, where switching the direction configured for the lane is based at least in part on the request.

In some examples, the indication of the request includes a data in UPIU.

In some examples, the lane is configured for sending information in the first direction from the memory system to the host system. In some examples, to determine whether the bandwidth condition associated with one or both of the first direction or the second direction satisfies the threshold, the bandwidth condition component 530 may be configured as or otherwise support a means for determining that a second bandwidth condition associated with the second direction from the host system to the memory system satisfies the threshold for reconfiguring the lane. In some examples, to switch the direction configured for the lane, the lane switching component 535 may be configured as or otherwise support a means for switching the lane from being configured for sending information in the first direction from the memory system to the host system to being configured for sending information in the second direction from the host system to the memory system based at least in part on determining that the second bandwidth condition associated with the second direction satisfies the threshold.

In some examples, the write operation component 555 may be configured as or otherwise support a means for receiving data from the host system according to the second bandwidth supported by the set of lanes for the second direction. In some examples, the bandwidth condition component 530 may be configured as or otherwise support a means for detecting that the memory system supports writing the data to a memory die at a rate exceeding the second bandwidth supported by the set of lanes for the second direction, where determining that the second bandwidth condition associated with the second direction satisfies the threshold is based at least in part on the detecting. In some examples, the request component 550 may be configured as or otherwise support a means for sending, to the host system, an indication of a request to reconfigure the set of lanes to support additional bandwidth in the second direction, where switching the direction configured for the lane is based at least in part on the request.

In some examples, the indication of the request includes an RTT UPIU.

In some examples, the lane switching indication component 540 may be configured as or otherwise support a means for receiving, from the host system, an indication to switch the direction configured for the lane, where the switching is based at least in part on the received indication.

In some examples, the lane switching indication component 540 may be configured as or otherwise support a means for sending, to the host system, an indication that the direction configured for the lane is switched based at least in part on the switching.

In some examples, to support switching the direction configured for the lane, the lane switching component 535 may be configured as or otherwise support a means for activating a transmit module and deactivating a receive module for the lane at the memory system. In some other examples, to support switching the direction configured for the lane, the lane switching component 535 may be configured as or otherwise support a means for activating a receive module and deactivating a transmit module for the lane at the memory system.

Figure 6:
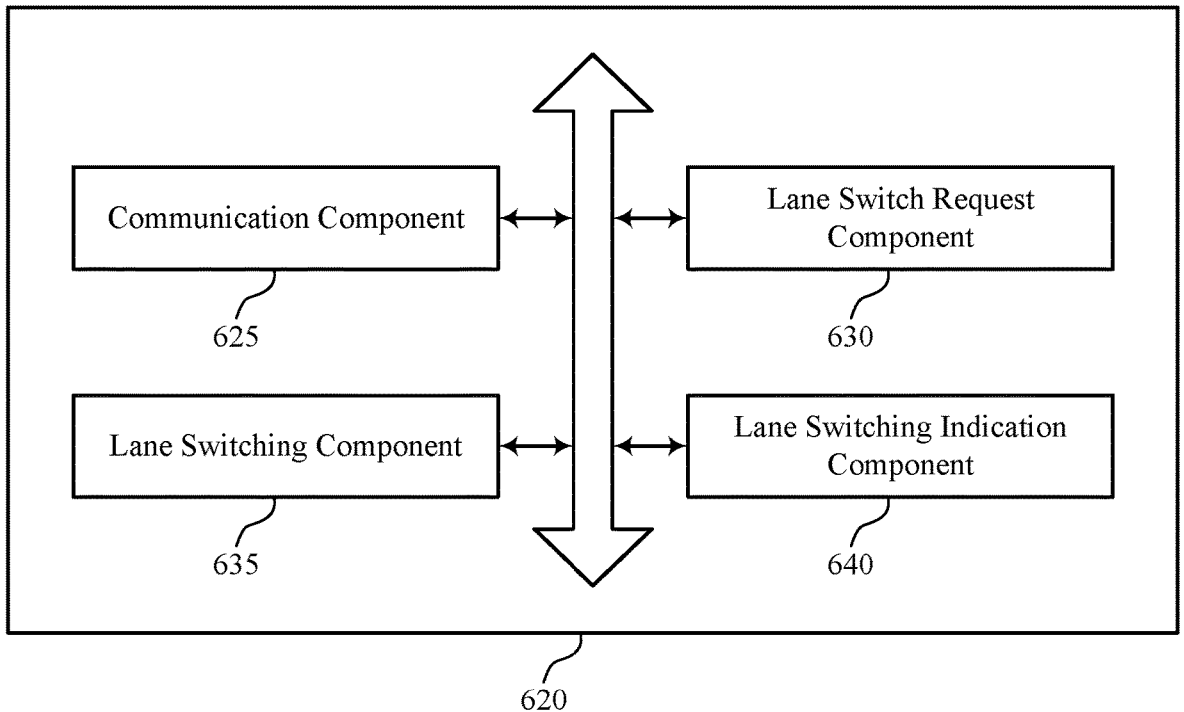
FIG. 6 shows a block diagram of a host system that supports switchable lane directions between the host system and a memory system in accordance with examples as disclosed herein.

FIG. 6 shows a block diagram 600 of a host system 620 that supports switchable lane directions between a host system and a memory system in accordance with examples as disclosed herein. The host system 620 may be an example of aspects of a host system as described with reference to FIGS. 1 through 4. The host system 620, or various components thereof, may be an example of means for performing various aspects of switchable lane directions between a host system and a memory system as described herein. For example, the host system 620 may include a communication component 625, a lane switch request component 630, a lane switching component 635, a lane switching indication component 640, or any combination thereof. Each of these components may communicate, directly or indirectly, with one another (e.g., via one or more buses).

The communication component 625 may be configured as or otherwise support a means for communicating information with a memory system using a set of lanes, where the set of lanes includes a first subset of lanes configured for sending information in a first direction from the memory system to the host system and a second subset of lanes configured for sending information in a second direction from the host system to the memory system. The lane switch request component 630 may be configured as or otherwise support a means for receiving, from the memory system, an indication of a request to reconfigure the set of lanes to support additional bandwidth in the first direction or the second direction. The lane switching component 635 may be configured as or otherwise support a means for switching a direction configured for a lane of the set of lanes based at least in part on the request to reconfigure the set of lanes to support the additional bandwidth in the first direction or the second direction.

In some examples, the lane is configured for sending information in the second direction from the host system to the memory system. In some examples, the indication of the request requests to reconfigure the set of lanes to support the additional bandwidth in the first direction. In some examples, to switch the direction configured for the lane, the lane switching component 635 may be configured as or otherwise support a means for switching the lane from being configured for sending information in the second direction from the host system to the memory system to being configured for sending information in the first direction from the memory system to the host system based at least in part on the request requesting to reconfigure the set of lanes to support the additional bandwidth in the first direction.

In some examples, the indication of the request includes a data in UPIU.

In some examples, the lane is configured for sending information in the first direction from the memory system to the host system. In some examples, the indication of the request requests to reconfigure the set of lanes to support the additional bandwidth in the second direction. In some examples, to switch the direction configured for the lane, the lane switching component 635 may be configured as or otherwise support a means for switching the lane from being configured for sending information in the first direction from the memory system to the host system to being configured for sending information in the second direction from the host system to the memory system based at least in part on the request requesting to reconfigure the set of lanes to support the additional bandwidth in the second direction.

In some examples, the indication of the request includes an RTT UPIU.

In some examples, the lane switching indication component 640 may be configured as or otherwise support a means for sending, to the memory system, an indication to switch the direction configured for the lane based at least in part on the switching.

Figure 7:
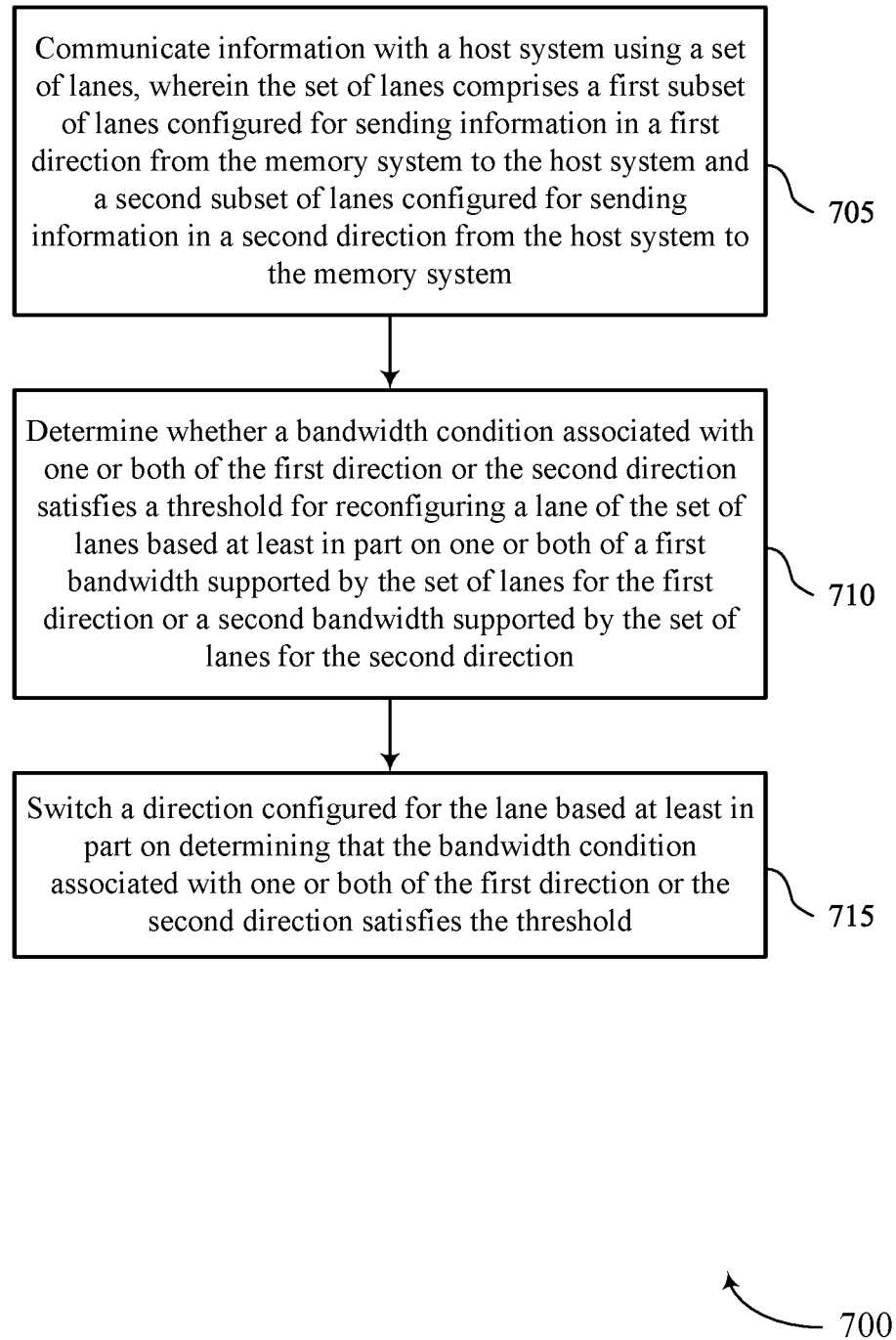
FIGS. 7 and 8 show flowcharts illustrating a method or methods that support switchable lane directions between a host system and a memory system in accordance with examples as disclosed herein.

FIG. 7 shows a flowchart illustrating a method 700 that supports switchable lane directions between a host system and a memory system in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 705, the method may include communicating information with a host system using a set of lanes, where the set of lanes includes a first subset of lanes configured for sending information in a first direction from the memory system to the host system and a second subset of lanes configured for sending information in a second direction from the host system to the memory system. The operations of 705 may be performed in accordance with examples as disclosed herein. In some examples, aspects of the operations of 705 may be performed by a communication component 525 as described with reference to FIG. 5.

At 710, the method may include determining whether a bandwidth condition associated with one or both of the first direction or the second direction satisfies a threshold for reconfiguring a lane of the set of lanes based at least in part on one or both of a first bandwidth supported by the set of lanes for the first direction or a second bandwidth supported by the set of lanes for the second direction. For example, the memory system may use the first bandwidth value or the second bandwidth value to determine the threshold for reconfiguring the lane and may compare the bandwidth condition to the determined threshold. The operations of 710 may be performed in accordance with examples as disclosed herein. In some examples, aspects of the operations of 710 may be performed by a bandwidth condition component 530 as described with reference to FIG. 5.

At 715, the method may include switching a direction configured for the lane based at least in part on (e.g., in response to) determining that the bandwidth condition associated with one or both of the first direction or the second direction satisfies the threshold. The operations of 715 may be performed in accordance with examples as disclosed herein. In some examples, aspects of the operations of 715 may be performed by a lane switching component 535 as described with reference to FIG. 5.

Aspects of the process flow 700 may be implemented by a controller, among other components. Additionally or alternatively, aspects of the process flow 700 may be implemented as instructions stored in memory (e.g., firmware stored in a memory coupled with a memory system). For example, the instructions, when executed by a controller (e.g., a memory system controller), may cause the controller to perform the operations of the process flow 700.

In some examples, an apparatus as described herein may perform a method or methods, such as the method 700. The apparatus may include, features, circuitry, logic, means, or instructions (e.g., a non-transitory computer-readable medium storing instructions executable by a processor) for communicating information with a host system using a set of lanes, where the set of lanes includes a first subset of lanes configured for sending information in a first direction from the memory system to the host system and a second subset of lanes configured for sending information in a second direction from the host system to the memory system, determining whether a bandwidth condition associated with one or both of the first direction or the second direction satisfies a threshold for reconfiguring a lane of the set of lanes based at least in part on one or both of a first bandwidth supported by the set of lanes for the first direction or a second bandwidth supported by the set of lanes for the second direction, and switching a direction configured for the lane based at least in part on determining that the bandwidth condition associated with one or both of the first direction or the second direction satisfies the threshold.

In some examples of the method 700 and the apparatus described herein, the lane may be configured for sending information in the second direction from the host system to the memory system, the determining may include determining that a first bandwidth condition associated with the first direction from the memory system to the host system satisfies the threshold for reconfiguring the lane, and the switching may include switching the lane from being configured for sending information in the second direction from the host system to the memory system to being configured for sending information in the first direction from the memory system to the host system based at least in part on determining that the first bandwidth condition associated with the first direction satisfies the threshold.

Some examples of the method 700 and the apparatus described herein may further include operations, features, circuitry, logic, means, or instructions for reading, from a memory die including a memory device, data to send to the host system, detecting that a quantity of the data read from the memory die exceeds the first bandwidth supported by the set of lanes for the first direction, where determining that the first bandwidth condition associated with the first direction satisfies the threshold may be based at least in part on the detecting, and sending, to the host system, an indication of a request to reconfigure the set of lanes to support additional bandwidth in the first direction, where switching the direction configured for the lane may be based at least in part on the request.

In some examples of the method 700 and the apparatus described herein, the indication of the request includes a data in UPIU.

In some examples of the method 700 and the apparatus described herein, the lane may be configured for sending information in the first direction from the memory system to the host system, the determining may include determining that a second bandwidth condition associated with the second direction from the host system to the memory system satisfies the threshold for reconfiguring the lane, and the switching may include switching the lane from being configured for sending information in the first direction from the memory system to the host system to being configured for sending information in the second direction from the host system to the memory system based at least in part on determining that the second bandwidth condition associated with the second direction satisfies the threshold.

Some examples of the method 700 and the apparatus described herein may further include operations, features, circuitry, logic, means, or instructions for receiving data from the host system according to the second bandwidth supported by the set of lanes for the second direction, detecting that the memory system supports writing the data to a memory die at a rate exceeding the second bandwidth supported by the set of lanes for the second direction, where determining that the second bandwidth condition associated with the second direction satisfies the threshold may be based at least in part on the detecting, and sending, to the host system, an indication of a request to reconfigure the set of lanes to support additional bandwidth in the second direction, where switching the direction configured for the lane may be based at least in part on the request.

In some examples of the method 700 and the apparatus described herein, the indication of the request includes an RTT UPIU.

Some examples of the method 700 and the apparatus described herein may further include operations, features, circuitry, logic, means, or instructions for receiving, from the host system, an indication to switch the direction configured for the lane, where the switching may be based at least in part on the received indication.

Some examples of the method 700 and the apparatus described herein may further include operations, features, circuitry, logic, means, or instructions for sending, to the host system, an indication that the direction configured for the lane may be switched based at least in part on the switching.

In some examples of the method 700 and the apparatus described herein, switching the direction configured for the lane may include operations, features, circuitry, logic, means, or instructions for activating a transmit module and deactivating a receive module for the lane at the memory system or activating a receive module and deactivating a transmit module for the lane at the memory system.

Figure 8:
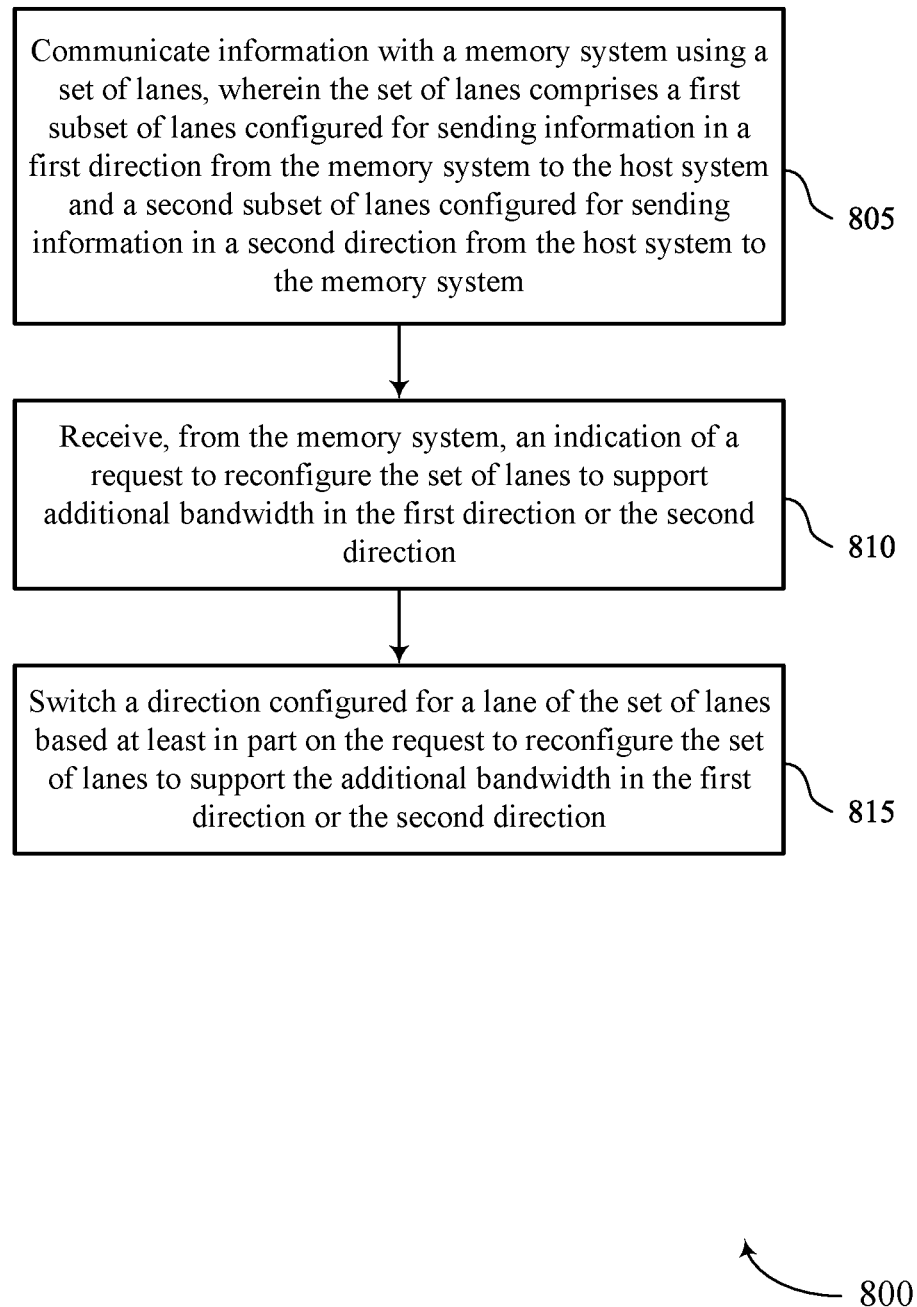

FIG. 8 shows a flowchart illustrating a method 800 that supports switchable lane directions between a host system and a memory system in accordance with examples as disclosed herein. The operations of method 800 may be implemented by a host system or its components as described herein. For example, the operations of method 800 may be performed by a host system as described with reference to FIGS. 1 through 4 and 6. In some examples, a host system may execute a set of instructions to control the functional elements of the device to perform the described functions. Additionally or alternatively, the host system may perform aspects of the described functions using special-purpose hardware.

At 805, the method may include communicating information with a memory system using a set of lanes, where the set of lanes includes a first subset of lanes configured for sending information in a first direction from the memory system to the host system and a second subset of lanes configured for sending information in a second direction from the host system to the memory system. The operations of 805 may be performed in accordance with examples as disclosed herein. In some examples, aspects of the operations of 805 may be performed by a communication component 625 as described with reference to FIG. 6.

At 810, the method may include receiving, from the memory system, an indication of a request to reconfigure the set of lanes to support additional bandwidth in the first direction or the second direction. The operations of 810 may be performed in accordance with examples as disclosed herein. In some examples, aspects of the operations of 810 may be performed by a lane switch request component 630 as described with reference to FIG. 6.

At 815, the method may include switching a direction configured for a lane of the set of lanes based at least in part on (e.g., in response to) the request to reconfigure the set of lanes to support the additional bandwidth in the first direction or the second direction. The operations of 815 may be performed in accordance with examples as disclosed herein. In some examples, aspects of the operations of 815 may be performed by a lane switching component 635 as described with reference to FIG. 6.

Aspects of the process flow 800 may be implemented by a controller, among other components. Additionally or alternatively, aspects of the process flow 800 may be implemented as instructions stored in memory (e.g., firmware stored in a memory coupled with a host system). For example, the instructions, when executed by a controller (e.g., a host system controller), may cause the controller to perform the operations of the process flow 800.

In some examples, an apparatus as described herein may perform a method or methods, such as the method 800. The apparatus may include, features, circuitry, logic, means, or instructions (e.g., a non-transitory computer-readable medium storing instructions executable by a processor) for communicating information with a memory system using a set of lanes, where the set of lanes includes a first subset of lanes configured for sending information in a first direction from the memory system to the host system and a second subset of lanes configured for sending information in a second direction from the host system to the memory system, receiving, from the memory system, an indication of a request to reconfigure the set of lanes to support additional bandwidth in the first direction or the second direction, and switching a direction configured for a lane of the set of lanes based at least in part on the request to reconfigure the set of lanes to support the additional bandwidth in the first direction or the second direction.

In some examples of the method 800 and the apparatus described herein, the lane may be configured for sending information in the second direction from the host system to the memory system, the indication of the request requests to reconfigure the set of lanes to support the additional bandwidth in the first direction, and the switching may include switching the lane from being configured for sending information in the second direction from the host system to the memory system to being configured for sending information in the first direction from the memory system to the host system based at least in part on the request requesting to reconfigure the set of lanes to support the additional bandwidth in the first direction.

In some examples of the method 800 and the apparatus described herein, the indication of the request includes a data in UPIU.

In some examples of the method 800 and the apparatus described herein, the lane may be configured for sending information in the first direction from the memory system to the host system, the indication of the request requests to reconfigure the set of lanes to support the additional bandwidth in the second direction, and the switching may include switching the lane from being configured for sending information in the first direction from the memory system to the host system to being configured for sending information in the second direction from the host system to the memory system based at least in part on the request requesting to reconfigure the set of lanes to support the additional bandwidth in the second direction.

In some examples of the method 800 and the apparatus described herein, the indication of the request includes an RTT UPIU.

Some examples of the method 800 and the apparatus described herein may further include operations, features, circuitry, logic, means, or instructions for sending, to the memory system, an indication to switch the direction configured for the lane based at least in part on the switching.

It should be noted that the methods described above describe possible implementations, and that the operations and the steps may be rearranged or otherwise modified and that other implementations are possible. Further, portions from two or more of the methods may be combined.

Another apparatus is described. The apparatus may include a memory system including a memory system controller and a link including a first lane, the link being between the memory system controller and a host system controller, where the first lane is configurable to send information to the host system controller based at least in part on activating a transmit module at the memory system controller and is configurable to receive information from the host system controller based at least in part on activating a receive module at the memory system controller.

In some examples of the apparatus, the memory system controller includes logic configured to activate the transmit module and deactivate the receive module, to activate the receive module and deactivate the transmit module, or both.

In some examples of the apparatus, the link includes a second lane, where the second lane may be configurable to send information to the host system controller based at least in part on activating a second transmit module at the memory system controller and may be configurable to receive information from the host system controller based at least in part on activating a second receive module at the memory system controller.

In some examples, the apparatus may include a second link including a third lane and a fourth lane, the second link being between the memory system controller and the host system controller, where the third lane supports sending information to the host system controller using a third transmit module at the memory system controller and the fourth lane supports receiving information from the host system controller using a third receive module at the memory system controller.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit according to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, DSL, or technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory system comprising a controller, the controller configured to cause the apparatus to:
   communicate information with a host system using a set of lanes, wherein the set of lanes comprises a first subset of lanes configured for sending information in a first direction from the memory system to the host system and a second subset of lanes configured for sending information in a second direction from the host system to the memory system;
   determine whether a bandwidth condition associated with one or both of the first direction or the second direction satisfies a threshold for reconfiguring a lane of the set of lanes based at least in part on one or both of a first bandwidth supported by the set of lanes for the first direction or a second bandwidth supported by the set of lanes for the second direction;
   send, to the host system, a ready to transfer (RTT) universal flash storage (UFS) protocol information unit (UPIU) to reconfigure the set of lanes to support additional bandwidth in the first direction or the second direction based at least in part on determining that the bandwidth condition associated with one or both of the first direction or the second direction satisfies the threshold; and
   switch a direction configured for the lane based at least in part on sending the RTT UFS UPIU.

2. The apparatus of claim 1, wherein:
   the lane is configured for sending information in the second direction from the host system to the memory system;
   the controller configured to cause the apparatus to determine whether the bandwidth condition associated with one or both of the first direction or the second direction satisfies the threshold is configured to cause the apparatus to:
   determine that a first bandwidth condition associated with the first direction from the memory system to the host system satisfies the threshold for reconfiguring the lane; and
   the controller configured to cause the apparatus to switch the direction configured for the lane is configured to cause the apparatus to:
   switch the lane from being configured for sending information in the second direction from the host system to the memory system to being configured for sending information in the first direction from the memory system to the host system based at least in part on determining that the first bandwidth condition associated with the first direction satisfies the threshold.

3. The apparatus of claim 2, wherein the controller is further configured to cause the apparatus to:
   read, from a memory die comprising a memory device, data to send to the host system; and
   detect that a quantity of the data read from the memory die exceeds the first bandwidth supported by the set of lanes for the first direction, wherein determining that the first bandwidth condition associated with the first direction satisfies the threshold is based at least in part on the detecting, wherein the RTT UFS UPIU requests to reconfigure the set of lanes to support additional bandwidth in the first direction.

4. The apparatus of claim 1, wherein:
   the lane is configured for sending information in the first direction from the memory system to the host system;
   the controller configured to cause the apparatus to determine whether the bandwidth condition associated with one or both of the first direction or the second direction satisfies the threshold is configured to cause the apparatus to:
   determine that a second bandwidth condition associated with the second direction from the host system to the memory system satisfies the threshold for reconfiguring the lane; and
   the controller configured to cause the apparatus to switch the direction configured for the lane is configured to cause the apparatus to:
   switch the lane from being configured for sending information in the first direction from the memory system to the host system to being configured for sending information in the second direction from the host system to the memory system based at least in part on determining that the second bandwidth condition associated with the second direction satisfies the threshold.

5. The apparatus of claim 4, wherein the controller is further configured to cause the apparatus to:
   receive data from the host system according to the second bandwidth supported by the set of lanes for the second direction;
   detect that the memory system supports writing the data to a memory die at a rate exceeding the second bandwidth supported by the set of lanes for the second direction, wherein determining that the second bandwidth condition associated with the second direction satisfies the threshold is based at least in part on the detecting, wherein the RTT UFS UPIU requests to reconfigure the set of lanes to support additional bandwidth in the second direction.

6. The apparatus of claim 1, wherein the controller is further configured to cause the apparatus to:
   receive, from the host system, an indication to switch the direction configured for the lane, wherein the switching is based at least in part on the received indication.

7. The apparatus of claim 1, wherein the controller is further configured to cause the apparatus to:
   send, to the host system, an indication that the direction configured for the lane is switched based at least in part on the switching.

8. The apparatus of claim 1, wherein the controller configured to cause the apparatus to switch the direction configured for the lane is configured to cause the apparatus to:
activate a transmit module and deactivate a receive module for the lane at the memory system; or
activate a receive module and deactivate a transmit module for the lane at the memory system.

9. An apparatus, comprising:
a host system comprising a controller configured to couple with a memory system, wherein the controller is configured to cause the apparatus to:
communicate information with the memory system using a set of lanes, wherein the set of lanes comprises a first subset of lanes configured for sending information in a first direction from the memory system to the host system and a second subset of lanes configured for sending information in a second direction from the host system to the memory system;
receive, from the memory system, a ready to transfer (RTT) universal flash storage (UFS) protocol information unit (UPIU) to reconfigure the set of lanes to support additional bandwidth in the first direction or the second direction; and
switch a direction configured for a lane of the set of lanes based at least in part on the RTT UFS UPIU to reconfigure the set of lanes to support the additional bandwidth in the first direction or the second direction.

10. The apparatus of claim 9, wherein:
the lane is configured for sending information in the second direction from the host system to the memory system;
the RTT UFS UPIU requests to reconfigure the set of lanes to support the additional bandwidth in the first direction; and
the controller configured to cause the apparatus to switch the direction configured for the lane is configured to cause the apparatus to:
switch the lane from being configured for sending information in the second direction from the host system to the memory system to being configured for sending information in the first direction from the memory system to the host system based at least in part on the RTT UFS UPIU requesting to reconfigure the set of lanes to support the additional bandwidth in the first direction.

11. The apparatus of claim 9, wherein:
the lane is configured for sending information in the first direction from the memory system to the host system;
the RTT UFS UPIU requests to reconfigure the set of lanes to support the additional bandwidth in the second direction; and
the controller configured to cause the apparatus to switch the direction configured for the lane is configured to cause the apparatus to:
switch the lane from being configured for sending information in the first direction from the memory system to the host system to being configured for sending information in the second direction from the host system to the memory system based at least in part on the RTT UFS UPIU requesting to reconfigure the set of lanes to support the additional bandwidth in the second direction.

12. The apparatus of claim 9, wherein the controller is further configured to cause the apparatus to:
send, to the memory system, an indication to switch the direction configured for the lane based at least in part on the switching.

13. An apparatus, comprising:
a memory system comprising a memory system controller; and
a link comprising a first lane, the link being between the memory system controller and a host system controller, wherein the first lane is configurable to send information to the host system controller based at least in part on activating a transmit module at the memory system controller and is configurable to receive information from the host system controller based at least in part on activating a receive module at the memory system controller, wherein the memory system controller comprises logic configured to send a ready to transfer (RTT) universal flash storage (UFS) protocol information unit (UPIU) to reconfigure the first lane to support additional bandwidth in a first direction or a second direction.

14. The apparatus of claim 13, wherein:
the memory system controller comprises logic configured to activate the transmit module and deactivate the receive module, to activate the receive module and deactivate the transmit module, or both.

15. The apparatus of claim 13, wherein:
the link comprises a second lane, wherein the second lane is configurable to send information to the host system controller based at least in part on activating a second transmit module at the memory system controller and is configurable to receive information from the host system controller based at least in part on activating a second receive module at the memory system controller.

16. The apparatus of claim 13, further comprising:
a second link comprising a third lane and a fourth lane, the second link being between the memory system controller and the host system controller, wherein the third lane supports sending information to the host system controller using a third transmit module at the memory system controller and the fourth lane supports receiving information from the host system controller using a third receive module at the memory system controller.

* * * * *